US012598132B2

(12) United States Patent
Zhang

(10) Patent No.: US 12,598,132 B2
(45) Date of Patent: Apr. 7, 2026

(54) DATA OBTAINING METHOD AND APPARATUS, DEVICE, AND STORAGE MEDIUM

(71) Applicant: HUAWEI TECHNOLOGIES CO., LTD., Shenzhen (CN)

(72) Inventor: Ka Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 504 days.

(21) Appl. No.: 18/180,262

(22) Filed: Mar. 8, 2023

(65) Prior Publication Data

US 2023/0291681 A1 Sep. 14, 2023

(30) Foreign Application Priority Data

Mar. 10, 2022 (CN) .......................... 202210230941.9

(51) Int. Cl.
*H04L 12/00* (2006.01)
*H04L 45/00* (2022.01)
*H04L 45/02* (2022.01)

(52) U.S. Cl.
CPC .............. *H04L 45/34* (2013.01); *H04L 45/04* (2013.01)

(58) Field of Classification Search
CPC ....... H04L 45/34; H04L 45/04; H04L 45/123; H04L 45/24; H04L 47/125; H04L 45/22; H04L 12/4633

(Continued)

(56) References Cited

U.S. PATENT DOCUMENTS 11,252,082 B1 * 2/2022 Saad ........................ H04L 45/50
11,258,702 B2 * 2/2022 Hu ........................... H04L 45/22
(Continued)

FOREIGN PATENT DOCUMENTS

CN          113992581 A  *  1/2022  ......... H04L 12/4633
WO     WO-2021170092 A1 *  9/2021  ............. H04L 45/34

OTHER PUBLICATIONS

Xun Shuo, CN113992581A, Message Processing Method of Message Processing Device Used in Seamless Bidirectional Forwarding Detection SBFD Sending End of Network Device, Searching Path Information and Generating SBFD Detection Response Message, and Returning to Opposite Network Device, 2021, 2 pages. (Year: 2021).*

(Continued)

*Primary Examiner* — Frantz Coby
(74) *Attorney, Agent, or Firm* — Maier & Maier, PLLC

(57) ABSTRACT

A obtaining method and apparatus, a device, and a storage medium, and pertains to the field of communication technologies. The method includes: a first node obtains first measurement information and second measurement information, where the first measurement information is measurement information of a first SR path, the second measurement information is measurement information of a second SR path, the first SR path is an SR path from the first node to a second node, and the second SR path is an SR path from the second node to the first node; determines a bidirectional path detection result based on the first measurement information and the second measurement information; and sends a notification message to a controller, where the notification message carries the bidirectional path detection result.

20 Claims, 5 Drawing Sheets

A first node obtains first measurement information and second measurement information, where the first measurement information is measurement information of a first SR path, the second measurement information is measurement information of a second SR path, the first SR path is an SR path from the first node to a second node, and the second SR path is an SR path from the second node to the first node ⟶ 401

The first node determines a bidirectional path detection result based on the first measurement information and the second measurement information, where the bidirectional path detection result indicates quality of a bidirectional SR path between the first node and the second node, and the bidirectional SR path includes the first SR path and the second SR path ⟶ 402

The first node sends a notification message to a controller, where the notification message carries the bidirectional path detection result ⟶ 403

(58) Field of Classification Search
      USPC ................................................. 370/218, 389
      See application file for complete search history.

(56)                    References Cited

U.S. PATENT DOCUMENTS 11,425,056 B1 *   8/2022  Kumar ..................... H04L 45/34
   12,177,134 B1 * 12/2024  Kumar ................. H04L 47/125
 2009/0086621 A1 *  4/2009  Wan ........................ H04L 45/22
                                                        370/218
 2023/0269167 A1 *  8/2023  Bhargava ............... H04L 45/02
                                                        709/238

OTHER PUBLICATIONS

Previdi et al., "Advertising Segment Routing Policies in BGP draft-ietf-idr-segment-routing-te-policy-14", Network Working Group, IETF Trust, Nov. 10, 2021, 44 pages.
Koldychev et al., "PCEP Extensions for Signaling Multipath Information draft-koldychev-pce-multipath-05", PCE Working Group, IETF Trust, Feb. 16, 2021, 19 pages.
Filsfils et al., "Network Programming extension: SRv6 uSID Instruction draft-filsfils-spring-net-pgm-extension-srv6-usid-10", Spring, IETF Trust, Mar. 10, 2021, 23 pages.
Filsfils et al., "IPv6 Segment Routing Header (SRH)", Internet Engineering Task Force (IETF), IETF Trust, Mar. 2020, ISSN: 2070-1721, 27 pages.

* cited by examiner

| Next Header | Hdr Ext Len | Routing Type | Segments Left |
|---|---|---|---|
| Last Entry | Flags | Tag ||
| Segment List[0] ||||
| ... ||||
| Segment List[n] ||||

DATA OBTAINING METHOD AND APPARATUS, DEVICE, AND STORAGE MEDIUM

CROSS-REFERENCE TO RELATED APPLICATIONS

This application claims priority to Chinese Patent Application No. 202210230941.9, filed on Mar. 10, 2022, which is incorporated herein by reference in its entirety.

TECHNICAL FIELD

The embodiments relate to the field of communication technologies, a data obtaining method and apparatus, a device, and a storage medium.

BACKGROUND

Segment routing (SR) is a technology in which an SR path is deployed at a head node of a network ingress to forward a message. A message forwarded through SR carries a segment identification (SID) list. The SID list includes SIDs of a plurality of nodes, to indicate the message to pass through the plurality of nodes, thereby implementing message forwarding. To determine whether quality (or performance) of an SR path meets a requirement, a detection result of the SR path may need to be obtained. Therefore, how to obtain such data becomes an urgent problem to be resolved currently.

SUMMARY

The embodiments may provide a data obtaining method and apparatus, a device, and a storage medium, to determine a bidirectional path detection result and send the bidirectional path detection result to a controller, so that the controller selects a more appropriate SR path for each service. The solutions are as follows:

According to a first aspect, a data obtaining method is provided. In the method, a first node obtains first measurement information and second measurement information, where the first measurement information is measurement information of a first segment routing SR path, the second measurement information is measurement information of a second SR path, the first SR path is an SR path from the first node to a second node, and the second SR path is an SR path from the second node to the first node; the first node determines a bidirectional path detection result based on the first measurement information and the second measurement information, where the bidirectional path detection result indicates quality of a bidirectional SR path between the first node and the second node, and the bidirectional SR path includes the first SR path and the second SR path; and the first node sends a notification message to a controller, where the notification message carries the bidirectional path detection result.

After the bidirectional path detection result is determined through the first measurement information and the second measurement information, the bidirectional path detection result is reported to the controller. In this way, the controller can use the bidirectional path detection result as a constraint of the bidirectional SR path and participate the bidirectional SR path in an end-to-end path computation scenario, so that the controller selects a more appropriate SR path for each service, and the controller maintains and manages the SR path.

Because the first SR path is an SR path from the first node to the second node, and the second SR path is an SR path from the second node to the first node, for the first SR path, the first node is a head node, and the second node is a tail node. For the second SR path, the second node is a head node, and the first node is a tail node. In addition, for the first node, the first SR path is a forward path, and the second SR path is a reverse path. For the second node, the second SR path is a forward path, and the first SR path is a reverse path.

Optionally, that a first node obtains second measurement information includes: The first node receives a measurement message sent by the second node, where the measurement message includes the second measurement information and a second path identifier, and the second path identifier identifies the second SR path.

Because the bidirectional path detection result needs to be determined, after receiving the measurement message, the first node not only can obtain the second measurement information through the measurement message, but also can use the second path identifier carried in the measurement message as an identifier of the reverse path, thereby facilitating subsequent determining of the bidirectional path detection result.

Optionally, the method further includes: The first node associates the first measurement information with the second measurement information based on a first path identifier and the second path identifier, where the first path identifier identifies the first SR path.

In some cases, the first node may be a head node of a plurality of SR paths. Therefore, to help the first node determine the detection result of the bidirectional SR path, when the measurement message includes the second measurement information and the second path identifier, the measurement message may further include the first path identifier. In this way, the first node can associate the first measurement information with the second measurement information based on the first path identifier and the second path identifier. In other words, it is determined that the first measurement information and the second measurement information are measurement information of the bidirectional SR path.

Optionally, the first node may further store a correspondence between identifiers of SR paths that are reverse to each other, that is, store a correspondence between the first path identifier and the second path identifier. In this way, when the measurement message carries only one path identifier, the first node may further obtain another path identifier from the correspondence, and further associate the first measurement information with the second measurement information based on the first path identifier and the second path identifier.

Optionally, before the first node obtains the first measurement information and the second measurement information, the method further includes: The first node receives a first SR policy sent by the controller, where the first SR policy includes first path information and the second path identifier, the first path information includes information about the first SR path, and the second path identifier identifies the second SR path. In other words, before the first node obtains the first measurement information and the second measurement information, the controller may further deliver the first SR policy to the first node, to deploy the first SR path on the first node. Similarly, the controller may further deliver a second SR policy to the second node, to deploy the second SR path on the second node. Details are not described.

Because the detection result of the bidirectional SR path needs to be obtained, the first SR policy sent by the controller to the first node not only includes the first path information, but also includes the second path identifier. In this way, after receiving the first SR policy, the first node can not only determine the first SR path through the first path information, but also learn that the identifier of the reverse path of the first SR path is the second path identifier. In other words, it can be determined, through the second path identifier, that the reverse path of the first SR path is the second SR path.

Optionally, the first SR path and the second SR path are bidirectional co-routed. Bidirectional co-route means that a node and a link that the first SR path passes through are the same as a node and a link that the second SR path passes through. The link is a link between ports of two nodes. When one node includes a plurality of ports, a plurality of links may exist between the two nodes. Moreover, a path may have a direction, and a link may not have a direction.

Optionally, the notification message further carries the first path identifier and the second path identifier, the first path identifier identifies the first SR path, and the second path identifier identifies the second SR path. In this way, it is convenient for the controller to manage and maintain, based on the first path identifier and the second path identifier, the first SR path and the second SR path that are forward and reverse to each other.

The notification message may be any type of message, provided that the message can carry the bidirectional path detection result. In an example, the notification message is a border gateway protocol BGP update message, the BGP update message includes network layer reachability information NLRI, the NLRI includes at least one type-length-value TLV field, and the at least one TLV field carries the bidirectional path detection result. In another example, the notification message is a path computation element protocol PCEP message, the PCEP message includes at least one metric object, and the at least one metric object carries the bidirectional path detection result.

Optionally, the bidirectional path detection result includes at least one of a bidirectional delay, a maximum bidirectional delay, a minimum bidirectional delay, a bidirectional delay difference, a bidirectional packet loss rate, and a bidirectional bit error ratio. The bidirectional path detection result may further include other data.

The bidirectional delay is a sum of a delay of the first SR path and a delay of the second SR path. The delay of the first SR path is a time difference between entering and leaving the first SR path by a same message. The delay of the second SR path is a time difference between entering and leaving the second SR path by a same message. Entering and leaving an SR path may be understood as a period from a moment when a head node of the SR path receives a message to a moment when a tail node sends the message.

The maximum bidirectional delay is a maximum of a plurality of bidirectional delays in a reference time period up to a current time. The minimum bidirectional delay is a minimum of the plurality of bidirectional delays in the reference time period up to the current time. Duration of the reference time period may be preset and may also be adjusted according to different requirements.

The bidirectional delay difference is a sum of a first delay difference and a second delay difference. The first delay difference is a difference between time differences between entering and leaving the first SR path by two adjacent messages. The second delay difference is a difference between time differences between entering and leaving the second SR path by two adjacent messages. In some cases, the bidirectional delay difference is also referred to as bidirectional jitter.

The bidirectional packet loss rate is a sum of a packet loss rate of the first SR path and a packet loss rate of the second SR path. The packet loss rate of the first SR path is a ratio of a quantity of lost messages to a quantity of sent messages on the first SR path in the reference time period up to the current time. The packet loss rate of the second SR path is a ratio of a quantity of lost messages to a quantity of sent messages on the second SR path in the reference time period up to the current time. A quantity of lost messages is a difference between a quantity of messages sent by a head node and a quantity of messages received by a tail node. A quantity of sent messages is the quantity of messages sent by the head node.

The bidirectional bit error ratio is a sum of a bit error ratio of the first SR path and a bit error ratio of the second SR path. The bit error ratio of the first SR path is a ratio of a quantity of erroneous bits transmitted to a total quantity of sent bits on the first SR path in the reference time period up to the current time. The bit error ratio of the second SR path is a ratio of a quantity of erroneous bits transmitted to a total quantity of sent bits on the second SR path in the reference time period up to the current time.

The foregoing is related content of the detection result of the bidirectional SR path sent by the first node to the controller. In actual application, the first node may further send a detection result of a unidirectional SR path to the controller. For example, the first node determines a unidirectional path detection result of the first SR path based on the first measurement information. The unidirectional path detection result includes a unidirectional delay, a maximum unidirectional delay, a minimum unidirectional delay, a unidirectional delay difference, a unidirectional packet loss rate, a unidirectional bit error ratio, and the like.

The unidirectional delay is the delay of the first SR path. The maximum unidirectional delay is a maximum of a plurality of unidirectional delays in the reference time period up to the current time. The minimum unidirectional delay is a minimum of the plurality of unidirectional delays in the reference time period up to the current time. The unidirectional delay difference is a difference between time differences between entering and leaving the first SR path by two adjacent messages. The unidirectional packet loss rate is the packet loss rate of the first SR path. The unidirectional bit error ratio is the bit error ratio of the first SR path.

When the first node sends the unidirectional path detection result to the controller through the notification message, the notification message may be alternatively the BGP update message or the PCEP message. When the notification message is the BGP update message, the BGP update message includes at least one TLV field, and the at least one TLV field carries the unidirectional path detection result. When the notification message is the PCEP message, the PCEP message may be a PCRep message, or may be a PCRpt message. Similar to the bidirectional path detection result, the two messages may further include at least one metric object, and the at least one metric object carries the unidirectional path detection result.

According to a second aspect, a data obtaining apparatus is provided. The data obtaining apparatus has a function of implementing behavior of the data obtaining method in the first aspect. The data obtaining apparatus includes at least one module, and the at least one module is configured to implement the data obtaining method provided in the first aspect.

According to a third aspect, a network device is provided. The network device includes a processor and a memory, and the memory is configured to store a computer program for performing the data obtaining method provided in the first aspect. The processor is configured to execute the computer program stored in the memory, to implement the data obtaining method according to the first aspect.

Optionally, the network device may further include a communication bus, and the communication bus is configured to establish a connection between the processor and the memory.

According to a fourth aspect, a chip is provided. The chip includes a programmable logic circuit and program instructions and is configured to implement the data obtaining method according to the first aspect when the chip runs on a computer.

According to a fifth aspect, a computer-readable storage medium is provided. The storage medium stores instructions, and when the instructions are run on a computer, the computer is enabled to perform the data obtaining method according to the first aspect.

According to a sixth aspect, a computer program product including instructions is provided. When the instructions are run on a computer, the computer is enabled to perform the data obtaining method according to the first aspect. In other words, a computer program is provided. When the computer program is run on a computer, the computer is enabled to perform the data obtaining method according to the first aspect.

Effects obtained in the second aspect to the sixth aspect are similar to effects obtained by the first aspect. Details are not described herein again.

BRIEF DESCRIPTION OF THE DRAWINGS

FIG. 1 is a schematic diagram of a structure of an SRH extension header;

FIG. 2 is a schematic diagram of an implementation environment;

DETAILED DESCRIPTION OF THE EMBODIMENTS

Figure 3:
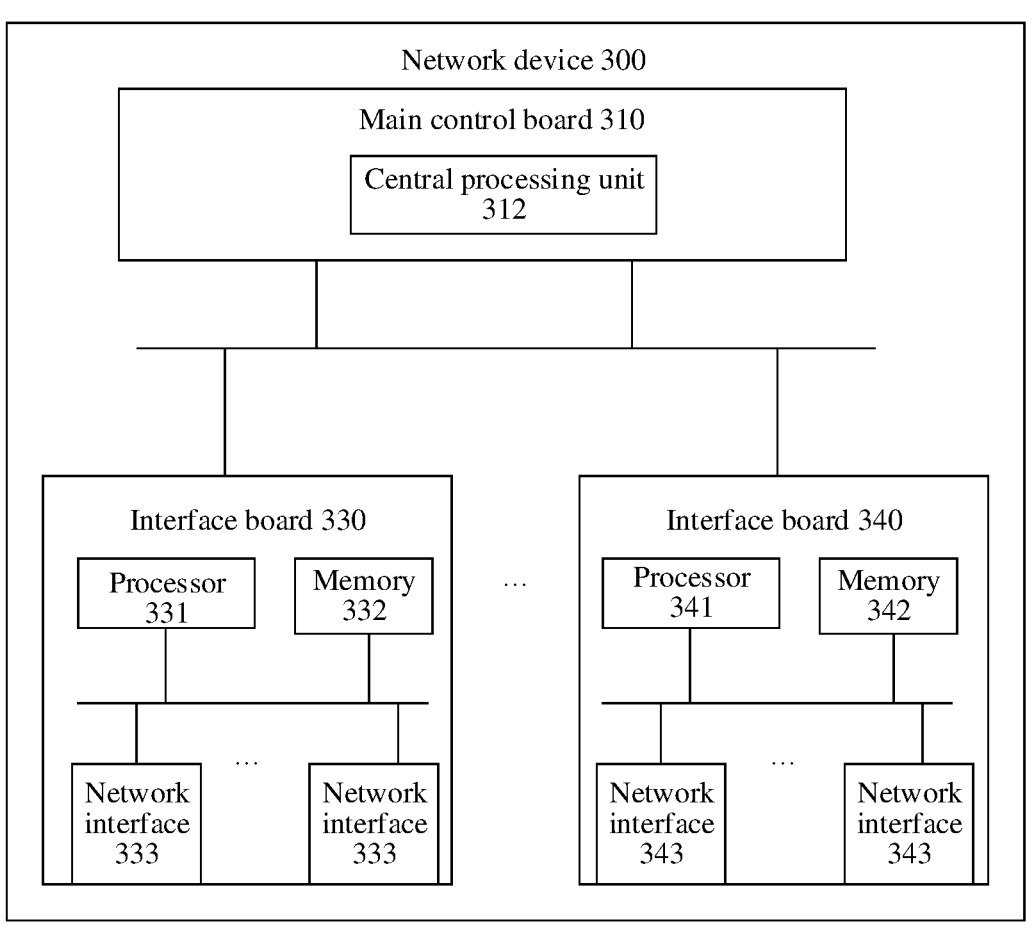
FIG. 3 is a schematic diagram of a structure of a network device.

To make the objectives, solutions, and advantages of the embodiments clearer, the following further describes the embodiments in detail with reference to the accompanying drawings.

SR technology is a technology in which an SR path is deployed at a head node of a network ingress to forward a message. By using the SR technology, an Internet protocol version 6 (IPv6) message, an Internet protocol version 4 (IPv4) message, a multiprotocol label switching (MPLS) message, and the like can be forwarded. Next, an IPv6 message is used as an example for description.

A technology that uses SR to forward an IPv6 message is referred to as an SRv6 technology, and an SR path used to forward an IPv6 message is referred to as an SRv6 path. The SRv6 technology refers to inserting a SID list into an IPv6 message. Each node on an SRv6 path uses the SID list to continuously update a destination address in an IPv6 message header, implementing hop-by-hop forwarding of the IPv6 message. The SID list includes a plurality of SIDs, the plurality of SIDs identify a plurality of nodes on the SRv6 path, and the SID list may be carried in the IPv6 message in the form of an extension header. In other words, an extension header is inserted into the IPv6 message, and the extension header includes the SID list.

Figures 1, 2:
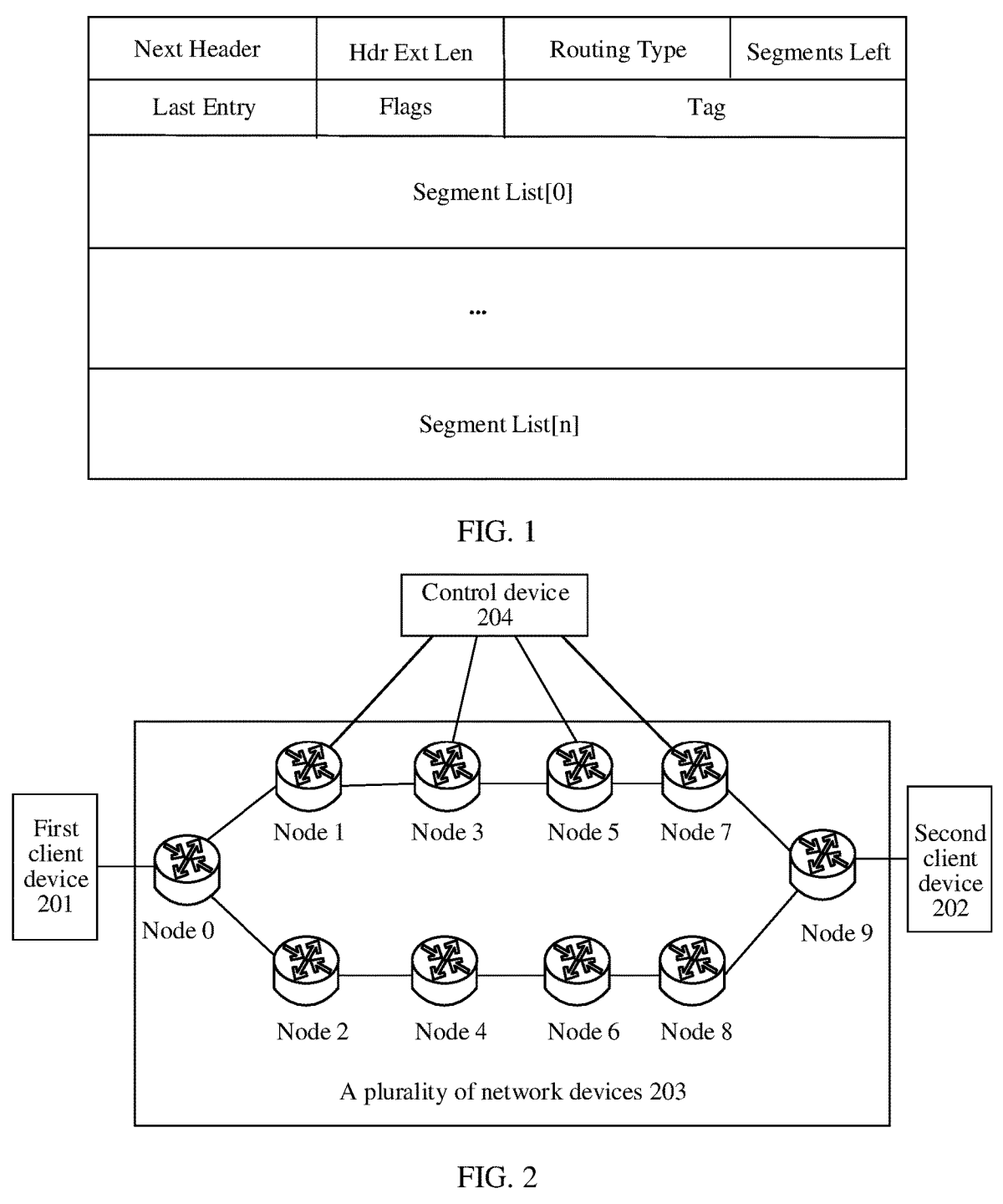

In some embodiments, the extension header may be a segment routing header (SRH). A possible structure of the SRH extension header is shown in FIG. 1. Key fields in the structure of the SRH extension header are described herein.

1. Next header, eight bits, identifying a type of a header immediately following an SRH extension header.
2. Length of the extension header (Hdr Ext Len), eight bits, indicating a length of the SRH excluding the first eight bytes (the first eight bytes are fixed).
3. Routing header type, eight bits, with a value of 4 and indicating that the current extension header is the SRH extension header.
4. Segments left (SL), eight bits, indicating a quantity of intermediate nodes that are still to be accessed before reaching a tail node of the SRv6 path.
5. Last entry, eight bits, indicating that the SID list includes an index of a last element of the SID list.
6. Flags, eight bits, referring to some identifiers of a message.
7. Tag, 16 bits, identifying messages in a same group.
8. SID list (Segment List[0]—Segment List[n]): 128 bits. The SID list is encoded from the last segment of the SRv6 path. Segment List is an IPv6 address form.

Segment List[0] indicates the penultimate node on the SRv6 path, that is, the tail node. Segment List[1] indicates the penultimate node on the SRv6 path. Segment List[n−1] indicates the second node on the SRv6 path. Segment List[n] indicates the first node on the SRv6 path, that is, the head node.

When the SRH extension header carries the SID list, in a forwarding process of the IPv6 message, each time the IPv6 message passes through a node, the node changes the destination address in the IPv6 message header to a SID of a next-hop node based on the SID list and decreases the SL field in the SRH extension header by 1. In other words, in SRv6, the destination address in the IPv6 message header identifies only the next-hop node of the current message and is constantly changing, not fixed. The SL field in the SRH extension header and the SID list jointly determine the destination address in the IPv6 header. For example, if the value of the SL field is n, the value of the destination address in the IPv6 header is the value of Segment List [n]. If the value of the SL field is n−1, the value of the destination address in the IPv6 header is the value of Segment List [n−1]. If the value of the SL field is 1, the value of the destination address in the IPv6 header is the value of Segment List [1]. If the value of the SL field is 0, the value of the destination address in the IPv6 header is the value of Segment List [0].

An IPv4 message and an MPLS message are forwarded by using the SR technology in a manner similar to the above. For example, when an IPv4 message is forwarded by using the SR technology, the foregoing message header is an IPv4 message header, and Segment List in the foregoing SID list is in the form of an IPv4 address. When an MPLS message is forwarded by using the SR technology, Segment List in the foregoing SID list is in the form of an MPLS label. In this case, the SID list may also be referred to as an MPLS label stack. However, different from SRv6, SR MPLS implements forwarding of the MPLS message by switching MPLS labels in the MPLS message.

FIG. 2 is a schematic diagram of an implementation environment. The implementation environment includes a first client device 201, a second client device 202, a plurality of network devices 203, and a controller 204. The first client device 201 and the second client device 202 are devices for processing a service on a user side, and the plurality of network devices 203 are devices for forwarding a message on a network side of an operator based on the SR technology. The first client device 201 communicates with the second client device 202 through some or all of the plurality of network devices 203, and the plurality of network devices 203 may be separately communicatively connected to the controller 204. In FIG. 2, only some network devices 203 are connected to the controller 204, and not all network devices 203 are connected to the controller 204.

The first client device 201 may send a message to the second client device 202 through the plurality of network devices 203. The second client device 202 may also send a message to the first client device 201 through the plurality of network devices 203. In addition, the plurality of network devices 203 may include a head node, intermediate nodes, and a tail node. When the first client device 201 sends a message to the second client device 202, a node 0 in FIG. 2 is a head node, a node 9 is a tail node, and other nodes are intermediate nodes. When the second client device 202 sends a message to the first client device 201, the node 9 in FIG. 2 is the head node, the node 0 is the tail node, and other nodes are intermediate nodes.

The controller 204 is configured to receive device information reported by each network device 203, to collect network topology information and determine an SR policy (SR Policy). The SR policy is then delivered to the head node included in the plurality of network devices 203. For example, when the first client device 201 sends a message to the second client device 202, the controller 204 determines a first SR policy, and delivers the first SR policy to the node 0. When the second client device 202 sends a message to the first client device 201, the controller 204 determines a second SR policy, and delivers the second SR policy to the node 9.

After the head node receives the SR policy delivered by the controller 204, the plurality of network devices 203 can forward the message between the first client device 201 and the second client device 202 based on a SID list corresponding to the SR policy. For example, when the first client device 201 sends a message to the second client device 202, the plurality of network devices 203 can forward, to the second client device 202 based on a SID list corresponding to the first SR policy, the message sent by the first client device 201. When receiving the message sent by the first client device 201, the head node (the node 0) inserts, into the message, the SID list corresponding to the first SR policy. The head node, the intermediate nodes, and the tail node may then forward the message based on the SID list corresponding to the first SR policy until the message arrives at the second client device 202.

For another example, when the second client device 202 sends a message to the first client device 201, the plurality of network devices 203 can forward, to the first client device 201 based on a SID list corresponding to the second SR policy, the message sent by the second client device 202. When receiving the message sent by the second client device 202, the head node (the node 9) inserts, into the message, the SID list corresponding to the second SR policy. The head node, the intermediate nodes, and the tail node may then forward the message based on the SID list corresponding to the second SR policy until the message arrives at the first client device 201.

In some scenarios, regardless of whether an IPv6 message, an IPv4 message, or an MPLS message is forwarded by using the SR technology, in a process of forwarding a message through an SR path, quality of the SR path further needs to be measured, to obtain a path detection result, such as a delay and a packet loss rate. Whether the quality of the SR path meets a requirement is then determined based on the path detection result, to maintain and manage the SR path. For example, in a cross-domain end-to-end path computation scenario, the controller 204 may need to use an SR path as an intra-domain logical link to participate in end-to-end path computation. Therefore, in the process in which the plurality of network devices 203 may forward the message, the quality of the SR path may be further measured to obtain the path detection result, and the path detection result is sent to the controller 204.

In some scenarios, not only a detection result of a unidirectional SR path is required, but also a detection result of a bidirectional SR path may be required. For example, in a scenario where an enterprise is interconnected to a branch, upstream and downstream services need to be identified. In this case, upstream and downstream traffic needs to pass through a same path. Therefore, when a detection result of an SR path is determined, statistics about detection results of forward and reverse SR paths need to be collected and reported to the controller 204 as link data. In this way, when a path detection result of one of the forward SR path or the reverse SR path does not meet a requirement, the detection result of the bidirectional SR path does not meet the requirement, and the controller 204 may switch the bidirectional SR path based on the bidirectional path detection result.

It should be noted that, the first client device 201 and the second client device 202 may be user-side network devices, for example, customer edge routers. The network device 203 may be a network device on an operator side. For example, the head node and the tail node may be provider edge routers, and the intermediate nodes may be provider backbone routers.

FIG. 3 is a schematic diagram of a structure of a network device. The network device may be the first client device, the second client device, the head node, the intermediate node, and the tail node shown in FIG. 2. The network device 300 may be a switch, a router, or another network device that forwards a message. In this embodiment, the network device 300 includes a main control board 310, an interface board 330, and an interface board 340. When the network device 300 includes a plurality of interface boards, the network device 300 may further include a switching board (not shown in the figure). The switching board is configured to complete data exchange between the interface boards (the interface boards are also referred to as line cards or service boards).

The main control board 310 is configured to implement functions such as system management, device maintenance, and protocol processing. The interface board 330 and the interface board 340 are configured to provide one or more network interfaces, for example, an Ethernet interface, a fast Ethernet (FE) interface, or a gigabit Ethernet (GE) interface, and implement message forwarding through these interfaces. The main control board 310, the interface board 330, and the interface board 340 are connected to a system backplane through a system bus to implement interworking. The interface board 330 includes one or more processors 331. The processor 331 is configured to control and manage the interface board, communicate with a central processing unit on the main control board, and forward a message. A memory 332 on the interface board 330 is configured to store a forwarding entry, and a processor 331 forwards a message by searching the forwarding entry stored in the memory 332. For a message forwarding process, refer to descriptions in the following embodiments. Details are not described herein again.

It may be understood that, as shown in FIG. 3, in this embodiment, a plurality of interface boards may be included, and a distributed forwarding mechanism is used. In this mechanism, operations on the interface board 340 are basically similar to operations on the interface board 330. For brevity, details are not described again. In addition, it may be understood that the processor 331 and/or the processor 341 on the interface board 330 in FIG. 3 may be dedicated hardware or a chip, for example, a network processor or an application-specific integrated circuit, to implement the foregoing functions. This implementation may be referred to as a manner of using dedicated hardware or a chip for processing on a forwarding plane. In another implementation, the processor 331 and/or the processor 341 may alternatively be a general-purpose processor, for example, a general-purpose CPU, to implement the foregoing functions.

In addition, it should be noted that, there may be one or more main control boards. When there may be a plurality of main control boards, the main control boards may include an active main control board and a standby main control board. There may be one or more interface boards, and a device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes the plurality of interface boards. Data exchange between the plurality of interface boards may be implemented by using the switching board, to provide a large-capacity data exchange and processing capability. Therefore, a data access and processing capability of a network device in the distributed architecture is better than that of a device in the centralized architecture. An architecture that is to be used depends on a networking deployment scenario. This is not limited herein.

In an embodiment, the memory 332 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of instructions or a data structure and that can be accessed by a computer, but is not limited thereto. The memory 332 may exist independently and may be connected to the processor 331 through a communication bus. Alternatively, the memory 332 may be integrated with the processor 331.

The memory 332 is configured to store program code. The processor 331 may execute the program code stored in the memory 332 to control execution, to implement a data obtaining method provided in the following embodiments. The program code stored in the memory 332 may include one or more software modules. The one or more software modules may be software modules provided in the following embodiments.

Figure 4:
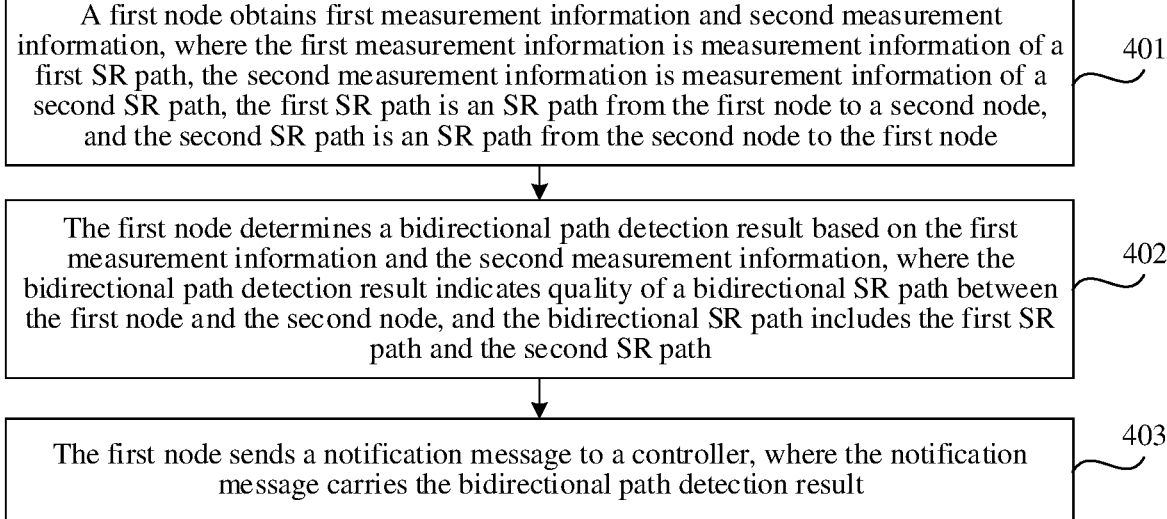
FIG. 4 is a flowchart of a data obtaining method.

Based on the foregoing description, in a process of forwarding a message through the plurality of network devices 203, not only a detection result of a unidirectional SR path can be obtained, but also a detection result of a bidirectional SR path can be obtained. The following first describes a process of obtaining a detection result of a bidirectional SR path. FIG. 4 is a flowchart of a data obtaining method. The method includes the following several steps.

Step 401: A first node obtains first measurement information and second measurement information, where the first measurement information is measurement information of a first SR path, the second measurement information is measurement information of a second SR path, the first SR path is an SR path from the first node to a second node, and the second SR path is an SR path from the second node to the first node.

In a process of forwarding messages through the first SR path, the messages may be measured to obtain the first measurement information. Similarly, in a process of forwarding messages through the second SR path, the messages may be measured to obtain the second measurement information.

In some embodiments, the messages forwarded on the first SR path may be measured in an end-to-end measurement manner, and the messages forwarded on the second SR path may be measured in the end-to-end measurement manner. That is, in the process of forwarding the messages through the first SR path, both the first node and the second node may measure the messages. In the process of forwarding the messages through the second SR path, both the first node and the second node may measure the messages.

The first measurement information may include a plurality of pieces of measurement information. Part of the measurement information is obtained by the first node through measurement, and the other part of the measurement information is obtained by the second node through measurement. Therefore, the second node may send information measured by the second node to the first node. In this way, the first node can obtain the first measurement information.

In an example, the first node receives a measurement message sent by the second node, where the measurement message includes the first measurement information and a first path identifier, and the first path identifier identifies the first SR path. The measurement information of the first SR path can be obtained through the measurement message.

Similarly, the second measurement information may include a plurality of pieces of measurement information. Part of the measurement information is obtained by the first node through measurement, and the other part of the measurement information is obtained by the second node through measurement. Therefore, the second node may send information measured by the second node to the first node. In this way, the first node can obtain the second measurement information.

In an example, the first node receives a measurement message sent by the second node, where the measurement message includes the second measurement information and a second path identifier, and the second path identifier identifies the second SR path. The measurement information of the second SR path can be obtained through the measurement message.

In this embodiment, the messages forwarded on the first SR path and the second SR path may be measured in the end-to-end measurement manner by using an in-situ flow information telemetry (IFIT) protocol. The messages forwarded on the first SR path and the second SR path may be alternatively measured in the end-to-end measurement manner by using another protocol, for example, a two-way active measurement protocol (TWAMP).

The IFIT protocol is used as an example. After the first node and the second node measure the messages forwarded on the first SR path, the first node generates an IFIT measurement message, where the IFIT measurement message includes information measured by the first node. The first node sends the IFIT measurement message to an intermediate node, and the intermediate node sends the IFIT measurement message to the second node. After receiving the IFIT measurement message, the second node adds information measured by the second node to the IFIT measurement message. In this case, the first IFIT measurement message includes the information measured by the first node and the information measured by the second node, that is, the first measurement information. The second node then sends the IFIT measurement message to the first node through the intermediate node. In this way, the first node can obtain the first measurement information.

Similarly, after the first node and the second node measure the messages forwarded on the second SR path, the second node generates an IFIT measurement message, where the IFIT measurement message includes information measured by the second node. The second node sends the IFIT measurement message to the intermediate node, and the intermediate node sends the IFIT measurement message to the first node. After receiving the IFIT measurement message, the first node adds the information measured by the first node to the IFIT measurement message. In this case, the IFIT measurement message includes the information measured by the first node and the information measured by the second node, that is, the second measurement information. In this way, the first node can obtain the second measurement information.

In some cases, the first node may be a head node of a plurality of SR paths. Therefore, to help the first node determine the detection result of the bidirectional SR path, when the measurement message includes the first measurement information and the first path identifier, the measurement message may further include the second path identifier. In this way, the first node can associate the first measurement information with the second measurement information based on the first path identifier and the second path identifier. In other words, it is determined that the first measurement information and the second measurement information are measurement information of the bidirectional SR path.

Similarly, when the measurement message includes the second measurement information and the second path identifier, the measurement message may further include the first path identifier. In this way, the first node can associate the first measurement information with the second measurement information based on the first path identifier and the second path identifier. In other words, it is determined that the first measurement information and the second measurement information are measurement information of the bidirectional SR path.

In some embodiments, the first node may further store a correspondence between identifiers of SR paths that are reverse to each other, that is, store a correspondence between the first path identifier and the second path identifier. In this way, when the measurement message carries only one path identifier, the first node may further obtain another path identifier from the correspondence, and further associate the first measurement information with the second measurement information based on the first path identifier and the second path identifier.

Because the first SR path is an SR path from the first node to the second node, and the second SR path is an SR path from the second node to the first node, for the first SR path, the first node is a head node, and the second node is a tail node. For the second SR path, the second node is a head node, and the first node is a tail node. In addition, for the first node, the first SR path is a forward path, and the second SR path is a reverse path. For the second node, the second SR path is a forward path, and the first SR path is a reverse path.

In some embodiments, the first SR path and the second SR path are bidirectional co-routed (bidirectional co-route). Bidirectional co-route means that a node and a link that the first SR path passes through are the same as a node and a link that the second SR path passes through. The link is a link between ports of two nodes. When one node includes a plurality of ports, a plurality of links may exist between the two nodes. Moreover, a path may have a direction and a link may not have a direction.

In some other embodiments, the first SR path and the second SR path are bidirectional associated paths. In other words, a node and a link that the first SR path passes through may be different from a node and a link that the second SR path passes through, provided that the first SR path and the second SR path are forward and reverse paths of each other.

Before the first node obtains the first measurement information and the second measurement information, a controller may further deliver SR policies to the first node and the second node, to deploy the first SR path on the first node and deploy the second SR path on the second node. The controller may send a first SR policy to the first node and the first node may receive the first SR policy sent by the controller. The first SR policy includes the first path information and the second path identifier, the first path information includes information about the first SR path, and the second path identifier identifies the second SR path. The controller sends a second SR policy to the second node, and the second node receives the second SR policy sent by the controller. The second SR policy includes the second path information and the first path identifier, the second path information includes information about the second SR path, and the first path identifier identifies the first SR path.

Because the detection result of the bidirectional SR path needs to be obtained, the first SR policy sent by the controller to the first node not only includes the first path information, but also includes the second path identifier. In this way, after receiving the first SR policy, the first node can not only determine the first SR path through the first path information, but also learn that the identifier of the reverse path of the first SR path is the second path identifier. In other words, it can be determined, through the second path identifier, that the reverse path of the first SR path is the second SR path. Similarly, the second SR policy sent by the controller to the second node not only includes the second path information, but also includes the first path identifier. In this way, after receiving the second SR policy, the second node can not only determine the second SR path through the second path information, but also learn that the identifier of the reverse path of the second SR path is the first path identifier. In other words, it can be determined, through the first path identifier, that the reverse path of the second SR path is the first SR path.

Optionally, the first SR policy may further include the first path identifier, and the second SR policy may further include the second path identifier.

The foregoing first path information may be a SID list of the first SR path or may be other information. For example, for SR MPLS, the first path information may be an IP address of each node on the first SR path. In this way, after receiving the first path information, the first node may convert an IP address of each node into a corresponding MPLS label, to obtain the SID list of the first SR path. Similarly, the second path information may be a SID list of the second SR path or may be other information. For example, for SR MPLS, the second path information may be an IP address of each node on the second SR path. In this way, after receiving the second path information, the first node may convert an IP address of each node into a corresponding MPLS label, to obtain the SID list of the second SR path.

The first path identifier may be a number allocated by the controller to the first SR path or may be determined by the controller based on an identifier of each node on the first SR path according to a rule. Similarly, the second path identifier may be a number allocated by the controller to the second SR path or may be determined by the controller based on an identifier of each node on the second SR path according to a rule.

The foregoing uses an example in which the controller delivers the first SR policy to the first node for description. In some other embodiments, the first SR policy may be pre-configured on the first node. In other words, a user manually configures the first SR policy on the first node. Similarly, for the second SR policy, the second SR policy may also be pre-configured on the second node.

Step 402: The first node determines a bidirectional path detection result based on the first measurement information and the second measurement information, where the bidirectional path detection result indicates quality of a bidirectional SR path between the first node and the second node, and the bidirectional SR path includes the first SR path and the second SR path.

The bidirectional path detection result includes at least one of a bidirectional delay, a maximum bidirectional delay, a minimum bidirectional delay, a bidirectional delay difference, a bidirectional packet loss rate, and a bidirectional bit error ratio. The bidirectional path detection result may further include other data.

The bidirectional delay is a sum of a delay of the first SR path and a delay of the second SR path. The delay of the first SR path is a time difference between entering and leaving the first SR path by a same message. The delay of the second SR path is a time difference between entering and leaving the second SR path by a same message. Entering and leaving an SR path may be understood as a period from a moment when a head node of the SR path receives a message to a moment when a tail node sends the message.

The maximum bidirectional delay is a maximum of a plurality of bidirectional delays in a reference time period up to a current time. The minimum bidirectional delay is a minimum of the plurality of bidirectional delays in the reference time period up to the current time. Duration of the reference time period may be preset and may also be adjusted according to different requirements.

The bidirectional delay difference is a sum of a first delay difference and a second delay difference. The first delay difference is a difference between time differences between entering and leaving the first SR path by two adjacent messages. The second delay difference is a difference between time differences between entering and leaving the second SR path by two adjacent messages. In some cases, the bidirectional delay difference is also referred to as bidirectional jitter.

The bidirectional packet loss rate is a sum of a packet loss rate of the first SR path and a packet loss rate of the second SR path. The packet loss rate of the first SR path is a ratio of a quantity of lost messages to a quantity of sent messages on the first SR path in the reference time period up to the current time. The packet loss rate of the second SR path is a ratio of a quantity of lost messages to a quantity of sent messages on the second SR path in the reference time period up to the current time. A quantity of lost messages is a difference between a quantity of messages sent by a head node and a quantity of messages received by a tail node. A quantity of sent messages is the quantity of messages sent by the head node.

The bidirectional bit error ratio is a sum of a bit error ratio of the first SR path and a bit error ratio of the second SR path. The bit error ratio of the first SR path is a ratio of a quantity of erroneous bits transmitted to a total quantity of sent bits on the first SR path in the reference time period up to the current time. The bit error ratio of the second SR path is a ratio of a quantity of erroneous bits transmitted to a total quantity of sent bits on the second SR path in the reference time period up to the current time.

When data included in the first measurement information and data included in the second measurement information are different, bidirectional path detection results determined by the first node are also different. When the first measurement information includes a first sending time stamp and a first receiving time stamp, and the second measurement information includes a second sending time stamp and a second receiving time stamp, the first node may determine the delay of the first SR path based on the first sending time stamp and the first receiving time stamp. The delay of the second SR path may be determined based on the second sending time stamp and the second receiving time stamp. The first node then adds the delay of the first SR path to the delay of the second SR path to obtain the bidirectional delay. The first sending time stamp and the first receiving time stamp are time stamps when the message enters and exits the first SR path, and the second sending time stamp and the second receiving time stamp are time stamps when the message enters and exits the second SR path.

After determining the bidirectional delay at the current time, the first node may further determine the maximum bidirectional delay and the minimum bidirectional delay based on the bidirectional delay determined before the current time in the reference time period. In addition, the first delay difference and the second delay difference may be further determined based on delays of forwarding a previous message on the first SR path and the second SR path, so that the bidirectional delay difference can be determined.

When the first measurement information includes the quantity of lost messages and the quantity of sent messages on the first SR path in the reference time period up to the current time, and the second measurement information includes the quantity of lost messages and the quantity of sent messages on the second SR path in the reference time period up to the current time, the first node may directly determine the ratio of the quantity of lost messages to the quantity of sent messages included in the first measurement information as the packet loss rate of the first SR path, determine the ratio of the quantity of lost messages to the quantity of sent messages included in the second measurement information as the packet loss rate of the second SR path, and further add the packet loss rate of the first SR path to the packet loss rate of the second SR path to obtain the bidirectional packet loss rate.

The first measurement information may alternatively include only information about whether the messages forwarded by the first SR path this time are discarded. In this way, a quantity of lost messages and a quantity of sent messages this time can be determined. Similarly, the second measurement information may also include only information about whether the messages forwarded by the second SR path this time are discarded. In this way, a quantity of lost messages and a quantity of sent messages this time can be determined. The bidirectional packet loss rate is then determined based on a quantity of historical lost messages and a quantity of sent messages in the reference time period up to the current time.

When the first measurement information includes the total quantity of bits and the quantity of erroneous bits transmitted in the messages forwarded on the first SR path this time, and the second measurement information includes the total quantity of bits and the quantity of erroneous bits transmitted in the messages forwarded on the second SR path this time, the first node may directly determine the ratio of the quantity of erroneous bits transmitted to the total quantity of bits included in the first measurement information as the bit error ratio of the first SR path, determine the ratio of the quantity of erroneous bits transmitted to the total quantity of bits included in the second measurement information as the bit error ratio of the second SR path, and further add the bit error ratio of the first SR path to the bit error ratio of the second SR path to obtain the bidirectional bit error ratio.

Step 403: The first node sends a notification message to a controller, where the notification message carries the bidirectional path detection result.

After the first node determines the bidirectional path detection result, the first node may send the notification message to the controller, to send the bidirectional path detection result to the controller, so that the controller manages and maintains the bidirectional SR path.

In some embodiments, the notification message may further carry the first path identifier and the second path identifier. In this way, it is convenient for the controller to manage and maintain, based on the first path identifier and the second path identifier, the first SR path and the second SR path that are forward and reverse to each other.

The notification message may be any type of message, provided that the message can carry the bidirectional path detection result. In an example, the notification message is a border gateway protocol (BGP) update message, the BGP update message includes network layer reachability information (NLRI), the NLRI includes at least one type-length-value (TLV) field, and the at least one TLV field carries the bidirectional path detection result.

Figure 5:
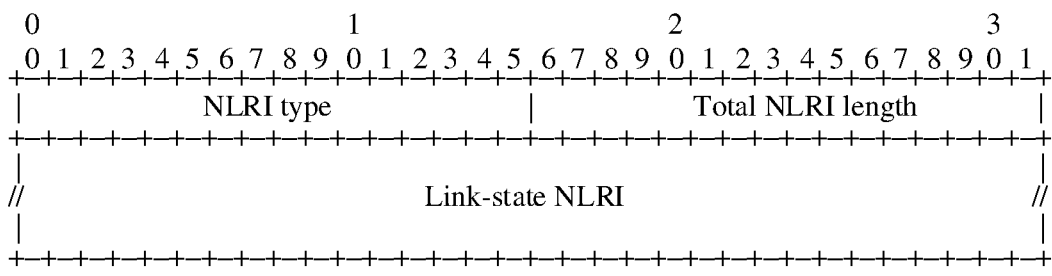
FIG. 5 is a schematic diagram of a format of NLRI.

A format of NLRI included in the BGP update message is shown in FIG. 5. Refer to FIG. 5. The NLRI includes three fields: an NLRI type, a total NLRI length, and link-state NLRI. The NLRI type indicates a type of the NLRI. For a traffic engineering (TE) policy, a value of the NLRI type is 5. The total NLRI length indicates a total quantity of bits occupied by the NLRI, and the link-state NLRI is used to report TE-related information. In addition, the length of the link-state NLRI is variable.

Figure 6:
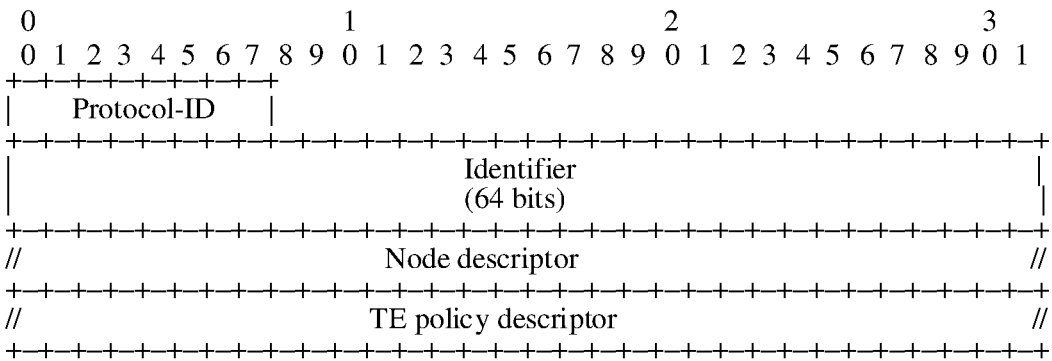
FIG. 6 is a schematic diagram of a format of link-state NLRI.

A format of the link-state NLRI is shown in FIG. 6. Refer to FIG. 6. The link-state NLRI includes four fields: a protocol identifier, an identifier, a node descriptor, and a TE Policy descriptor. A length of the TE policy descriptor is variable. In addition, the TE policy descriptor may include at least one TLV field, and the at least one TLV field carries the bidirectional path detection result.

Figure 7:
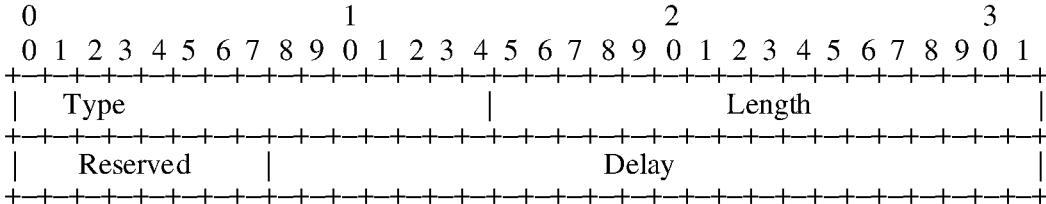
FIG. 7 is a schematic diagram of a format of a TLV field carrying a bidirectional delay.

A format of a TLV field carrying the bidirectional delay is shown in FIG. 7. The TLV field includes four subfields: type, length, reserved, and delay. The type indicates that the TLV field is a TLV field of the bidirectional delay. The length indicates a quantity of bits occupied by the TLV field and is 4 bytes. The delay indicates the bidirectional delay.

Figure 8:
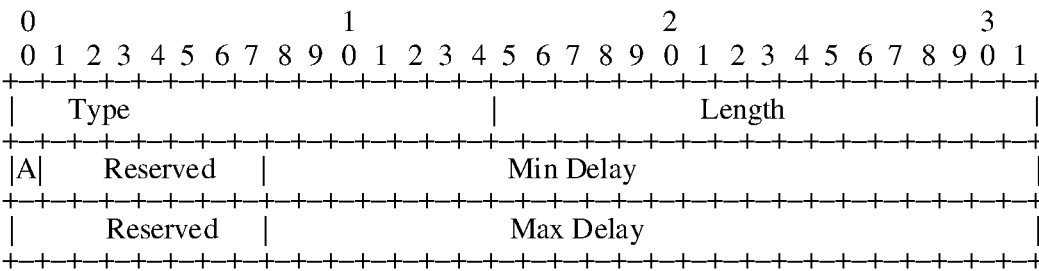
FIG. 8 is a schematic diagram of a format of a TLV field carrying a maximum bidirectional delay and a minimum bidirectional delay.

A format of a TLV field carrying the maximum bidirectional delay and the minimum bidirectional delay is shown in FIG. 8. The TLV field includes seven subfields: type, length, Anomalous (A), reserved, minimum delay (Min Delay), reserved, and maximum delay (Max Delay). The type indicates that the TLV field is a TLV field of the maximum bidirectional delay and the minimum bidirectional delay. The length indicates a quantity of bits occupied by the TLV field and is 8 bytes. A indicates whether a difference between the maximum bidirectional delay and the minimum bidirectional delay is abnormal. If the difference between the maximum bidirectional delay and the minimum bidirectional delay exceeds a maximum fluctuation threshold, it indicates that the difference between the maximum bidirectional delay and the minimum bidirectional delay is abnormal and A is 1; otherwise, A is 0. The minimum delay indicates the minimum bidirectional delay (bidirectional min delay). The maximum delay indicates the maximum bidirectional delay (bidirectional max delay).

Figure 9:
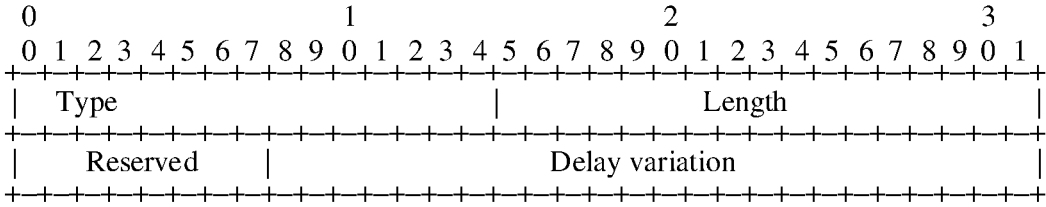
FIG. 9 is a schematic diagram of a format of a TLV field carrying a bidirectional delay difference.

A format of a TLV field carrying the bidirectional delay difference is shown in FIG. 9. The TLV field includes four subfields: type, length, reserved, and delay variation. The type indicates that the TLV field is a TLV field of the bidirectional delay difference. The length indicates a quantity of bits occupied by the TLV field and is 8 bytes. The delay variation indicates the bidirectional delay difference.

Figure 10:
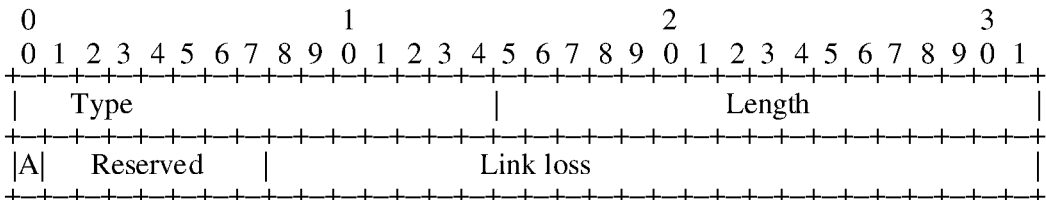
FIG. 10 is a schematic diagram of a format of a TLV field carrying a bidirectional packet loss rate.

A format of a TLV field carrying the bidirectional packet loss rate is shown in FIG. 10. The TLV field includes five subfields: type, length, Anomalous (A), reserved, and link loss. The type indicates that the TLV field is a TLV field of the bidirectional packet loss rate. The length indicates a quantity of bits occupied by the TLV field and is 4 bytes. A indicates whether the bidirectional packet loss rate is abnormal. If the bidirectional packet loss rate exceeds a maximum packet loss rate threshold, it indicates that the bidirectional packet loss rate is abnormal, and A is 1; otherwise, A is 0. The link loss indicates the bidirectional packet loss rate.

Figure 11:
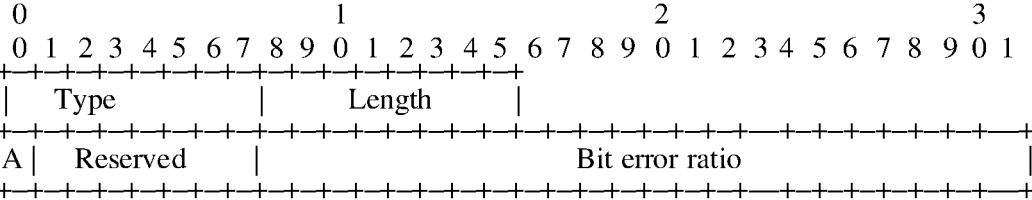
FIG. 11 is a schematic diagram of a format of a TLV field carrying a bidirectional bit error ratio.

A format of a TLV field carrying the bidirectional bit error ratio is shown in FIG. 11. The TLV field includes five subfields: type, length, Anomalous (A), reserved, and bit error ratio. The type indicates that the TLV field is a TLV field of the bidirectional bit error ratio. The length indicates a quantity of bits occupied by the TLV field and is 4 bytes. A indicates whether the bidirectional bit error ratio is abnormal. If the bidirectional bit error ratio exceeds a maximum bit error ratio threshold, it indicates that the bidirectional bit error ratio is abnormal and A is 1; otherwise, A is 0. The bit error ratio indicates the bidirectional bit error ratio.

The maximum fluctuation threshold, the maximum packet loss rate threshold, and the maximum bit error ratio threshold are preset, and in different cases, the thresholds may be further adjusted.

In another example, the notification message is a path computation element protocol (PCEP) message, the PCEP message includes at least one metric object, and the at least one metric object carries the bidirectional path detection result.

The PCEP message may be a path computation reply (PCRep) message, or may be a path computation state report (PCRpt) message.

A format of a PCRep message is as follows:

```
<PCRep Message> ::= < Common Header>
                         <response-list>
    where
        <response-list>::=<response>[<response-list>]
        <response>::=<RP>
                     [<LSP>]
                     [<NO-PATH>]
                     [<attribute-list>]
                     [<path-list>]
```

A format of a PCRpt message is as follows:

```
<PCRpt Message> ::= < Common Header>
                         <state-report-list>
    where
        <state-report-list> ::= <state-report>[<state-report-list>]
        <state-report> ::= [<SRP>]
                           <LSP>
                           <path>
    where
        <path> := <intended-path>
                  [<actual-attribute-list><actual-path>]
                  <intended-attribute-list>
        <actual-attribute-list> ::= [<BANDWIDTH>]
                                    [<metric-list>]
```

In the PCRep message, attribute-list may include at least one metric object (metric). In the PCRpt message, metric-list of actual-attribute-list includes at least one metric object. The at least one metric object carries the bidirectional delay, the maximum bidirectional delay, the minimum bidirectional delay, the bidirectional delay difference, the bidirectional packet loss rate, and the bidirectional bit error ratio above.

Figure 12:
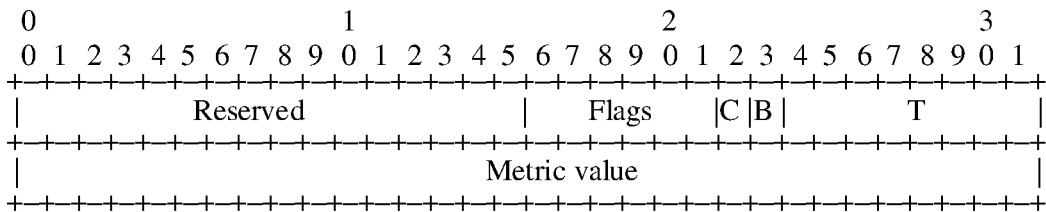
FIG. 12 is a schematic diagram of a format of a metric object.

A format of a metric object is shown in FIG. 12. The metric object may include six fields: reserved, flag, C, B, T, and metric-value. Flags refer to some flag bits. Currently, two flag bits are defined: C and B. T refers to a metric type. In this embodiment, a value of T is 2, and indicates TE. The metric value indicates any one of the foregoing bidirectional detection results.

The foregoing is related content of the detection result of the bidirectional SR path sent by the first node to the controller. In actual application, the first node may further send a detection result of a unidirectional SR path to the controller. For example, the first node determines a unidirectional path detection result of the first SR path based on the first measurement information. The unidirectional path detection result includes a unidirectional delay, a maximum unidirectional delay, a minimum unidirectional delay, a unidirectional delay difference, a unidirectional packet loss rate, a unidirectional bit error ratio, and the like.

The unidirectional delay is the delay of the first SR path. The maximum unidirectional delay is a maximum of a plurality of unidirectional delays in the reference time period up to the current time. The minimum unidirectional delay is a minimum of the plurality of unidirectional delays in the reference time period up to the current time. The unidirectional delay difference is a difference between time differences between entering and leaving the first SR path by two adjacent messages. The unidirectional packet loss rate is the packet loss rate of the first SR path. The unidirectional bit error ratio is the bit error ratio of the first SR path.

Figure 13:
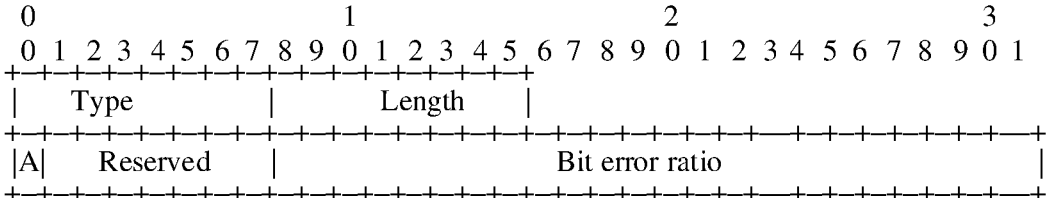
FIG. 13 is a schematic diagram of a format of a TLV field carrying a unidirectional bit error ratio.

When the first node sends the unidirectional path detection result to the controller through the notification message, the notification message may be alternatively the BGP update message or the PCEP message. When the notification message is the BGP update message, the BGP update message includes at least one TLV field, and the at least one TLV field carries the unidirectional path detection result. A format of a TLV field carrying the unidirectional path detection result is similar to that of the bidirectional path detection result. Using the unidirectional bit error ratio as an example, a format of a TLV field carrying the unidirectional bit error ratio is shown in FIG. 13. The TLV field includes five subfields: type, length, Anomalous (A), reserved, and bit error ratio. The type indicates that the TLV field is a TLV field of the unidirectional bit error ratio. The length indicates a quantity of bits occupied by the TLV field and is 4 bytes. A indicates whether the unidirectional bit error ratio is abnormal. If the unidirectional bit error ratio exceeds the maximum bit error ratio threshold, the unidirectional bit error ratio is abnormal and A is 1; otherwise, A is 0. The bit error ratio indicates the unidirectional bit error ratio.

When the notification message is the PCEP message, the PCEP message may be a PCRep message, or may be a PCRpt message. Similar to the bidirectional path detection result, the two messages may further include at least one metric object, and the at least one metric object carries the unidirectional path detection result.

It should be noted that, the foregoing uses the first node as an example to describe a process of reporting the bidirectional path detection result and the unidirectional path detection result. In another embodiment, the second node may also report the bidirectional path detection result and the unidirectional path detection result to the controller. In this case, the unidirectional path detection result reported by the second node is the detection result of the second SR path. In addition, a manner in which the second node determines the bidirectional path detection result is similar to the manner in which the first node determines the bidirectional path detection result, and a manner in which the second node determines the detection result of the second SR path is similar to the manner in which the first node determines the detection result of the first SR path. Details are not described herein again.

In this embodiment, after the bidirectional path detection result is determined through the first measurement information and the second measurement information, the bidirectional path detection result is reported to the controller. In this way, the controller can use the bidirectional path detection result as a constraint of the bidirectional SR path and participate the bidirectional SR path in an end-to-end path computation scenario, so that the controller selects a more appropriate SR path for each service, and the controller maintains and manages the SR path. In addition, in this embodiment, not only the bidirectional path detection result can be reported, but also the unidirectional path detection result can be reported. In this way, different scenarios can be covered.

Figure 14:
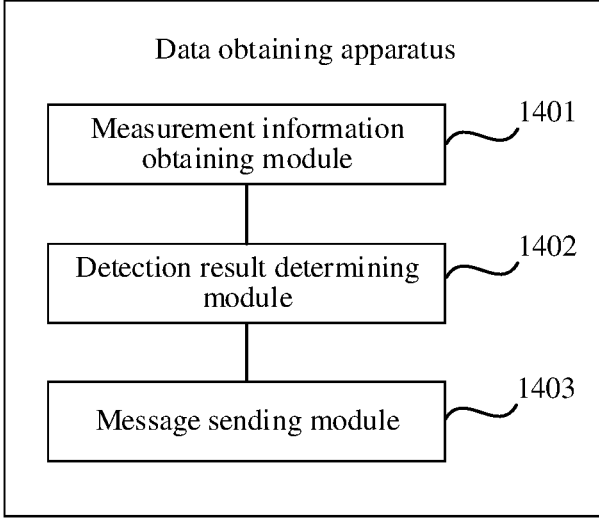
FIG. 14 is a schematic diagram of a structure of a data obtaining apparatus.

FIG. 14 is a schematic diagram of a structure of a data obtaining apparatus. The data obtaining apparatus may be implemented as a part or all of a network device by using software, hardware, or a combination thereof. The network device may be the first node described above. The apparatus includes: a measurement information obtaining module 1401, a detection result determining module 1402, and a message sending module 1403.

The measurement information obtaining module 1401 is configured to obtain first measurement information and second measurement information, where the first measurement information is measurement information of a first segment routing SR path, the second measurement information is measurement information of a second SR path, the first SR path is an SR path from a first node to a second node, and the second SR path is an SR path from the second node to the first node.

The detection result determining module 1402 is configured to determine a bidirectional path detection result based on the first measurement information and the second measurement information, where the bidirectional path detection result indicates quality of a bidirectional SR path between the first node and the second node, and the bidirectional SR path includes the first SR path and the second SR path.

The message sending module 1403 is configured to send a notification message to a controller, where the notification message carries the bidirectional path detection result.

Optionally, the measurement information obtaining module 1401 is further configured to:

receive a measurement message sent by the second node, where the measurement message includes the second measurement information and a second path identifier, and the second path identifier identifies the second SR path.

Optionally, the apparatus further includes:

a measurement information association module, configured to associate the first measurement information with the second measurement information based on a first path identifier and the second path identifier, where the first path identifier identifies the first SR path.

Optionally, the apparatus further includes:

an SR policy obtaining module, configured to receive a first SR policy sent by the controller, where the first SR policy includes first path information and the second path identifier, the first path information includes information about the first SR path, and the second path identifier identifies the second SR path.

Optionally, the first SR path and the second SR path are bidirectional co-routed.

Optionally, the notification message further carries the first path identifier and the second path identifier, the first path identifier identifies the first SR path, and the second path identifier identifies the second SR path.

Optionally, the notification message is a border gateway protocol (BGP) update message, the BGP update message includes network layer reachability information (NLRI), the NLRI includes at least one type-length-value (TLV) field, and the at least one TLV field carries the bidirectional path detection result.

Optionally, the notification message is a path computation element protocol (PCEP) message, the PCEP message includes at least one metric object, and the at least one metric object carries the bidirectional path detection result.

Optionally, the bidirectional path detection result includes at least one of a bidirectional delay, a maximum bidirectional delay, a minimum bidirectional delay, a bidirectional delay difference, a bidirectional packet loss rate, and a bidirectional bit error ratio.

In this embodiment, after the bidirectional path detection result is determined through the first measurement information and the second measurement information, the bidirectional path detection result is reported to the controller. In this way, the controller can use the bidirectional path detection result as a constraint of the bidirectional SR path and participate the bidirectional SR path in an end-to-end path computation scenario, so that the controller selects a more appropriate SR path for each service, and the controller maintains and manages the SR path. In addition, in this embodiment, not only the bidirectional path detection result can be reported, but also the unidirectional path detection result can be reported. In this way, different scenarios can be covered.

It should be noted that, when the data obtaining apparatus provided in the foregoing embodiment obtains the bidirectional path detection result, division into the foregoing functional modules is merely used as an example for description. In actual application, the foregoing functions may be allocated to different functional modules for implementation based on a requirement. In other words, an inner structure of the apparatus is divided into different functional modules, to implement all or some of the functions described above. In addition, the data obtaining apparatus provided in the foregoing embodiments and embodiments of the data obtaining method pertain to the same concept. For an implementation process of the apparatus, refer to the method embodiments. Details are not described herein again.

An embodiment may provide a network device. The network device includes a memory and a processor. The memory is configured to store a computer program, and the processor is configured to execute the computer program stored in the memory, to implement all or some of the steps of the method provided in the foregoing method embodiments.

An embodiment may provide a non-transitory computer-readable storage medium. The non-transitory computer-readable storage medium stores a computer program. When the computer program is executed, all or some of the steps of the method provided in the foregoing method embodiments are implemented.

An embodiment may provide a computer program product. The computer program product includes a program or code. When the program or the code is executed, all or some of the steps of the method provided in the foregoing method embodiments are implemented.

An embodiment may provide a chip. The chip includes a programmable logic circuit and/or program instructions. When the chip runs, the chip is configured to implement all or some of the steps of the method provided in the foregoing method embodiments.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to embodiments are all or partially generated. The computer may be a general-purpose computer, a dedicated computer, a computer network, or other programmable apparatuses. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state drive (SSD)), or the like. It should be noted that, the computer-readable storage medium mentioned in this embodiment may be a non-volatile storage medium, or in other words, may be a non-transitory storage medium.

It should be understood that "a plurality of" means two or more. In the descriptions, unless otherwise specified, "/" means "or". For example, A/B may represent A or B. In the embodiments, "and/or" describes only an association relationship between associated objects and represents that three relationships may exist. For example, A and/or B may represent the following three cases: only A exists, both A and B exist, and only B exists. In addition, to describe the embodiments, terms such as "first" and "second" are used to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that, information (including, but not limited to, user equipment information and user personal information), data (including, but not limited to, data used for analysis, stored data, and displayed data), and signals involved are authorized by the user or fully authorized by all parties, and collection, use, and processing of related data need to comply with related laws, regulations, and standards of related countries and regions.

The foregoing descriptions are merely embodiments, but are not intended as limiting. Any modification, equivalent replacement, or improvement made without departing from the spirit and principle should fall within the scope of the embodiments.

What is claimed is:

1. A data obtaining method, comprising:
    obtaining, by a first node, first measurement information and second measurement information, wherein the first measurement information is measurement information of a first segment routing (SR) path, the second measurement information is measurement information of a second SR path, the first SR path is an SR path from the first node to a second node, and the second SR path is an SR path from the second node to the first node;
    determining, by the first node, a bidirectional path detection result based on the first measurement information and the second measurement information, wherein the bidirectional path detection result indicates quality of a bidirectional SR path between the first node and the second node, and the bidirectional SR path comprises the first SR path and the second SR path; and
    sending, by the first node, a notification message to a controller for network operation, wherein the notification message carries the bidirectional path detection result.

2. The data obtaining method according to claim 1, wherein obtaining, by the first node, the second measurement information further comprises:
    receiving, by the first node, a measurement message sent by the second node, wherein the measurement message comprises the second measurement information and a second path identifier, and the second path identifier identifies the second SR path.

3. The data obtaining method according to claim 2, further comprising:
    associating, by the first node, the first measurement information with the second measurement information based on a first path identifier and the second path identifier, wherein the first path identifier identifies the first SR path.

4. The data obtaining method according to claim 2, wherein before obtaining, by the first node, the first measurement information and the second measurement information, the method further comprises:
    receiving, by the first node, a first SR policy sent by the controller, wherein the first SR policy comprises first path information and the second path identifier, the first path information comprises information about the first SR path, and the second path identifier identifies the second SR path.

5. The data obtaining method according to claim 1, wherein the first SR path and the second SR path are bidirectionally co-routed.

6. The data obtaining method according to claim 3, wherein the notification message further carries the first path identifier and the second path identifier, the first path identifier identifies the first SR path, and the second path identifier identifies the second SR path.

7. The data obtaining method according to claim 1, wherein the notification message is a border gateway protocol (BGP) update message, the BGP update message comprises network layer reachability information (NLRI), the NLRI comprises at least one type-length-value (TLV) field, and the at least one TLV field carries the bidirectional path detection result.

8. The data obtaining method according to claim 1, wherein the notification message is a path computation element protocol (PCEP) message, the PCEP message comprises at least one metric object, and the at least one metric object carries the bidirectional path detection result.

9. The data obtaining method according to claim 1, wherein the bidirectional path detection result comprises at least one of a bidirectional delay, a maximum bidirectional delay, a minimum bidirectional delay, a bidirectional delay difference, a bidirectional packet loss rate, or a bidirectional bit error ratio.

10. A data obtaining apparatus, comprising:
    a non-transitory memory storing instructions; and
    a processor coupled to the non-transitory memory; wherein the instructions, when executed by the processor, cause the apparatus to be configured to:
    obtain first measurement information and second measurement information, wherein the first measurement information is measurement information of a first segment routing (SR) path, the second measurement information is measurement information of a second SR path, the first SR path is an SR path from a first node to a second node, and the second SR path is an SR path from the second node to the first node;

determine a bidirectional path detection result based on the first measurement information and the second measurement information, wherein the bidirectional path detection result indicates quality of a bidirectional SR path between the first node and the second node, and the bidirectional SR path comprises the first SR path and the second SR path; and send a notification message to a controller for network operation, wherein the notification message carries the bidirectional path detection result.

11. The data obtaining apparatus according to claim 10, wherein the instructions, when executed by the processor, further cause the apparatus to be configured to:

receive a measurement message sent by the second node, wherein the measurement message comprises the second measurement information and a second path identifier, and the second path identifier identifies the second SR path.

12. The data obtaining apparatus according to claim 11, wherein the instructions, when executed by the processor, further cause the apparatus to be configured to:

associate the first measurement information with the second measurement information based on a first path identifier and the second path identifier, wherein the first path identifier identifies the first SR path.

13. The data obtaining apparatus according to claim 11, wherein the instructions, when executed by the processor, further cause the apparatus to be configured to:

receive a first SR policy sent by the controller, wherein the first SR policy comprises first path information and the second path identifier, the first path information comprises information about the first SR path, and the second path identifier identifies the second SR path.

14. The data obtaining apparatus according to claim 10, wherein the first SR path and the second SR path are bidirectionally co-routed.

15. The data obtaining apparatus according to claim 12, wherein the notification message further carries the first path identifier and the second path identifier, the first path identifier identifies the first SR path, and the second path identifier identifies the second SR path.

16. The data obtaining apparatus according to claim 10, wherein the notification message is a border gateway protocol (BGP) update message, the BGP update message comprises network layer reachability information (NLRI), the NLRI comprises at least one type-length-value (TLV) field, and the at least one TLV field carries the bidirectional path detection result.

17. The data obtaining apparatus according to claim 10, wherein the notification message is a path computation element protocol (PCEP) message, the PCEP message comprises at least one metric object, and the at least one metric object carries the bidirectional path detection result.

18. The data obtaining apparatus according to claim 10, wherein the bidirectional path detection result comprises at least one of a bidirectional delay, a maximum bidirectional delay, a minimum bidirectional delay, a bidirectional delay difference, a bidirectional packet loss rate, or a bidirectional bit error ratio.

19. A non-transitory computer-readable storage medium, wherein the non-transitory computer-readable storage medium stores instructions, and when the instructions are run on a computer, the computer is enabled to perform:

obtaining first measurement information and second measurement information, wherein the first measurement information is measurement information of a first segment routing (SR) path, the second measurement information is measurement information of a second SR path, the first SR path is an SR path from a first node to a second node, and the second SR path is an SR path from the second node to the first node;

determining a bidirectional path detection result based on the first measurement information and the second measurement information, wherein the bidirectional path detection result indicates quality of a bidirectional SR path between the first node and the second node, and the bidirectional SR path comprises the first SR path and the second SR path; and sending a notification message to a controller for network operation, wherein the notification message carries the bidirectional path detection result.

20. The non-transitory computer-readable storage medium according to claim 19, wherein the bidirectional path detection result comprises at least one of a bidirectional delay, a maximum bidirectional delay, a minimum bidirectional delay, a bidirectional delay difference, a bidirectional packet loss rate, or a bidirectional bit error ratio.

* * * * *